(12) United States Patent
Onodera

(10) Patent No.: US 7,557,968 B2
(45) Date of Patent: Jul. 7, 2009

(54) DOCUMENT FEEDER AND IMAGE FORMING APPARATUS

(75) Inventor: Kazuo Onodera, Ibaraki (JP)

(73) Assignee: Canon Finetech Inc., Ibaraki-Ken (JP)

( * ) Notice: Subject to any disclaimer, the term of this patent is extended or adjusted under 35 U.S.C. 154(b) by 1067 days.

(21) Appl. No.: 10/429,787

(22) Filed: May 6, 2003

(65) Prior Publication Data

US 2003/0214096 A1     Nov. 20, 2003

(30) Foreign Application Priority Data

May 14, 2002     (JP)     ............... 2002-139128

(51) Int. Cl.
*B65H 5/00*     (2006.01)
(52) U.S. Cl. ............................ 358/498; 271/264
(58) Field of Classification Search ............... 358/498, 358/496, 488, 486, 497, 482, 483, 406, 504, 358/506, 505, 304, 296, 468, 492, 412, 451; 399/367, 371, 395, 394; 355/3, 14, 26, 308; 271/265, 264, 3, 10, 110, 114; 382/312–315
See application file for complete search history.

(56) References Cited

U.S. PATENT DOCUMENTS

| | | | | |
|---|---|---|---|---|
| 4,391,505 A | * | 7/1983 | Silverberg | ............ 399/372 |
| 4,611,904 A | * | 9/1986 | Wada | ............ 399/82 |
| 4,972,235 A | * | 11/1990 | Iwamoto et al. | ............ 399/370 |
| 5,118,089 A | * | 6/1992 | Yamada et al. | ............ 271/3.16 |
| 5,203,554 A | * | 4/1993 | Suzuki et al. | ............ 271/10.05 |
| 5,204,724 A | * | 4/1993 | Nakabayashi et al. | ............ 399/361 |
| 5,205,548 A | * | 4/1993 | Yamada et al. | ............ 271/3.2 |
| 5,223,905 A | | 6/1993 | Yamada et al. | ............ 355/316 |
| 5,423,526 A | * | 6/1995 | Hasegawa | ............ 271/10.13 |
| 5,481,354 A | * | 1/1996 | Nakajima | ............ 399/371 |
| 5,663,804 A | * | 9/1997 | Kataoka et al. | ............ 358/304 |
| 5,819,151 A | * | 10/1998 | Naito et al. | ............ 399/367 |
| 5,915,158 A | * | 6/1999 | Minagawa et al. | ............ 399/370 |
| 6,256,473 B1 | * | 7/2001 | Kamanuma et al. | ............ 399/367 |
| 6,356,735 B1 | * | 3/2002 | Hozumi | ............ 399/395 |
| 6,438,351 B2 | * | 8/2002 | Kawachi et al. | ............ 399/394 |
| 6,526,185 B1 | * | 2/2003 | Murakami | ............ 382/312 |
| 6,585,258 B1 | * | 7/2003 | Hirota et al. | ............ 271/186 |
| 2002/0081134 A1 | * | 6/2002 | Miyamoto et al. | ............ 399/405 |

FOREIGN PATENT DOCUMENTS

| | | |
|---|---|---|
| JP | 10-51599 | 2/1998 |
| JP | 2002-16754 | 1/2002 |

* cited by examiner

*Primary Examiner*—King Y Poon
*Assistant Examiner*—Allen H Nguyen
(74) *Attorney, Agent, or Firm*—Fitzpatrick, Cella, Harper & Scinto

(57) ABSTRACT

A document feeder for transporting a document to a predetermined reading position at which image reading is performed by an image reading portion, including: a document transport portion for transporting the document to a reading standby position upstream of the reading position; and a control portion for controlling the document transport portion so that the document is made to stop at the reading standby position if the image reading portion is not in an image readable state by the time the document arrives at the reading standby position.

4 Claims, 12 Drawing Sheets

DOCUMENT FEEDER AND IMAGE FORMING APPARATUS

BACKGROUND OF THE INVENTION

1. Field of the Invention

The present invention relates to a document feeder and an image forming apparatus provided with the document feeder. In particular, the present invention relates to document feeding control when transporting the document to a reading position.

2. Related Background Art

Documents are automatically fed to a predetermined reading position on a platen glass plate in conventional image forming apparatuses such as digital copying machines, printers, and facsimiles, and therefore an auto document feeder, which is a document feeder, is provided on the apparatus main body so as to be openable and closable. Reading of an image is then performed by using an exposure portion with respect to the document that is thus automatically transported by the auto document feeder.

Here, a method of reading an image by fixing an exposure apparatus below the predetermined reading position of the platen glass plate, and moving the document over the exposure apparatus at a fixed speed (hereinafter referred to as flow reading) is conventionally known as this type of method of reading a document image.

If this type of flow reading is performed with a conventional auto document feeder, a document is transported to the reading position after determining whether or not the exposure apparatus is capable of reading. The document is therefore stopped temporarily at an initial feed position as a standby position before the document is transported to the reading position, regardless of whether or not the exposure apparatus is capable of reading. It is then verified that image reading is allowed, and thereafter the document is transported to the reading position.

However, the document must be temporarily stopped at the initial feed position with the above-mentioned structure, regardless of the fact that image reading is possible, and therefore the number of sheets processed becomes less. Further, there is an inconvenience in that document transport operation is not stable because the document being transported is temporarily stopped, and then again transported.

SUMMARY OF THE INVENTION

The present invention has been made in view of the present situation as described, and an object of the present invention is to provide a document feeder capable of increasing the number of documents processed, and an image forming apparatus having the document feeder.

In order to solve the above-mentioned problems, according to the present invention, there is provided a document feeder for transporting a document to a predetermined reading position at which image reading is performed by an image reading portion, including: a document transport portion for transporting the document to a reading standby position upstream of the reading position; and a control portion for controlling the document transport portion so that the document is made to stop at the reading standby position if the image reading portion is not in an image readable state by the time the document arrives at the reading standby position.

Other objects and characteristics of the present invention will be apparent from the following specification and drawings.

DESCRIPTION OF THE PREFERRED EMBODIMENTS

Embodiments of the present invention are explained in detail below using the diagrams.

Figure 1:
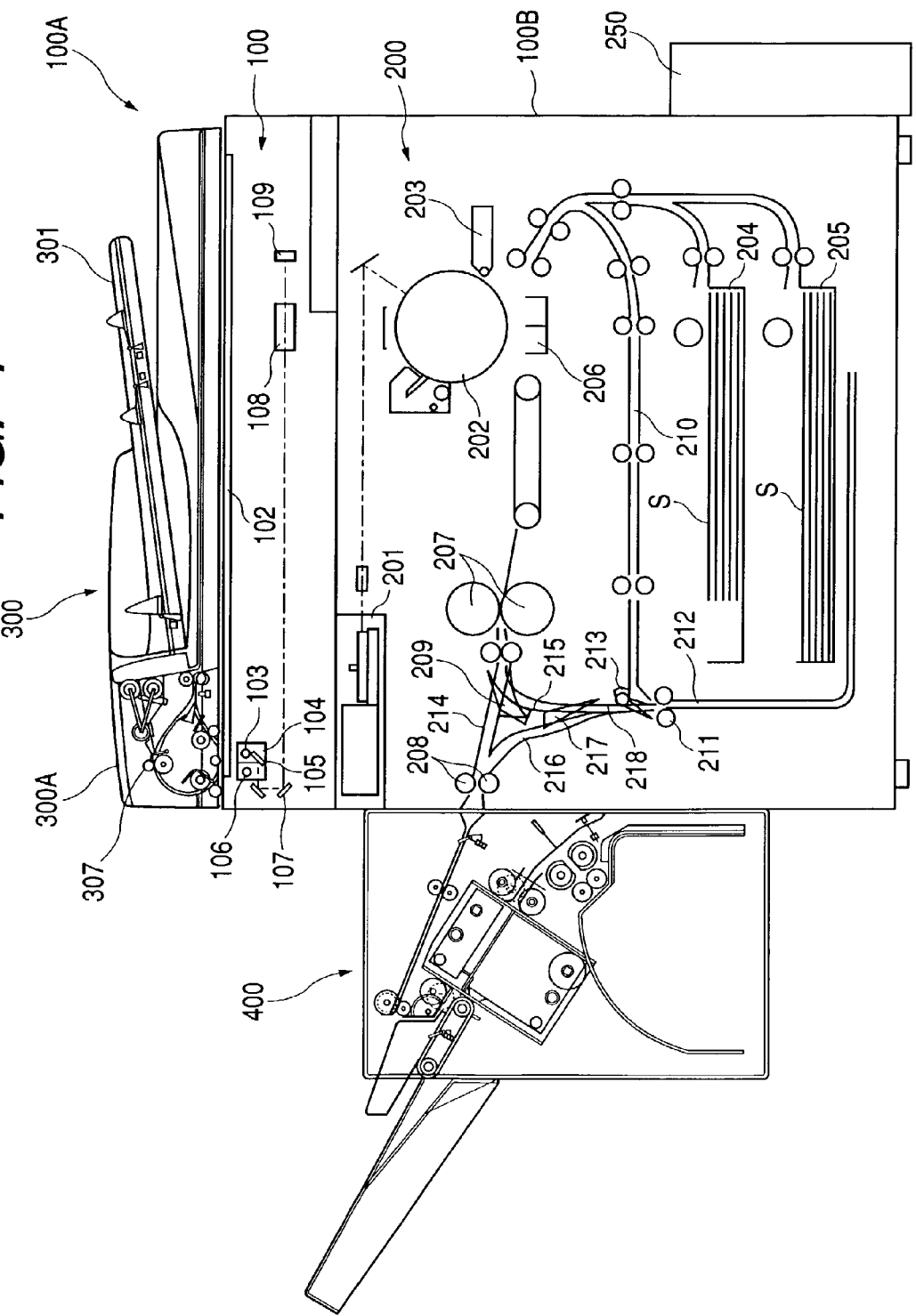
FIG. 1 is a diagram showing a schematic structure of an image forming apparatus provided with an auto document feeder in accordance with an embodiment of the present invention.

FIG. 1 is a diagram showing the schematic structure of an image forming apparatus provided with an auto document feeder, which is an example of a document feeder in accordance with an embodiment of the present invention.

Reference numeral 100A in FIG. 1 denotes an image forming apparatus; reference numeral 100 denotes a reader portion (image input portion) for converting an document to image data; reference numeral 200 denotes a printer portion (image output portion) having a plurality of types of recording sheet cassettes 204 and 205, and which outputs the image data onto a recording sheet as a visible image in accordance with a print command; reference numeral 400 denotes a finisher provided in a side edge of an image forming apparatus main body 100B; and reference numeral 250 denotes an external apparatus that is electrically connected to the reader portion 100.

Reference numeral 300 denotes an auto document feeder (hereinafter referred to as ADF) that is openable and closable is provided on an upper surface of the image forming apparatus main body 100B. An document stacked thereupon is transported onto a platen glass plate in order one sheet at a time. A lamp 103 of a scanner unit 104 provided in the reader portion 100 turns on once the document is transported to a predetermined position on the platen glass plate 102, the scanner unit 104 moves, and the document is irradiated.

Note that light reflected from the document passes through mirrors 105, 106, 107, and 108, and is input to a CCD image sensor portion 109. The CCD image sensor portion 109 performs electronic processing such as photoelectric conversion, and normal digital processing is implemented. Image signals are then input to the printer portion 200.

An image can be read-in in this embodiment by so-called flow reading, in which the reader portion 100 fixes the scanner unit 104 in a predetermined position and reads the document.

On the other hand, in an exposure control portion 201, the image signals thus input to the printer portion 200 are converted into optical signals, and irradiated to a photosensitive body 202. A latent image is formed on the photosensitive body 202 by the irradiated light. Note that a developing device 203 develops the latent image.

Recording sheets S are then transported from the recording sheet cassettes 204 and 205 at timings in conformity with the leading edge of the developed images, and the developed images are transferred to the recording sheets S by a transfer portion 206. In addition, the transferred images are then delivered to an apparatus external portion by a delivery portion 208 after being fixed to the recording sheets by a fixing portion 207. Separation, stapling, and the like are performed by the finisher 400 corresponding to an operation mode set in advance.

Double sided printing becomes possible with the image forming apparatus 100A of this embodiment. A method of forming read-in images in order on two sides of one recording sheet S is explained next.

The recording sheet S, on which an image is fixed to one side by the fixing portion 207, is first guided to a path 215 by setting a first direction switching member 209 to the direction of a solid line in FIG. 1 when forming images on both sides of the recording sheet S. The recording sheet S is then transported up to a surface reverse path 212 through a path 218 by setting a second direction switching member 217 to the direction of the solid line, and setting a third direction switching member 213 to the direction of a dashed line.

After the trailing edge of the recording sheet S passes through the third direction switching member 213, the recording sheet S is reversed and transported to a re-feeding stacking portion 210 by switching the third direction switching member 213 to the solid line direction and reversing the direction of rotation of a reversing roller 211. The document image is then read similar to the above processes when the next document is ready, but the recording sheet S is supplied by the re-feeding stacking portion 210, and therefore two document images can be output, to the front side and the back side of the same output sheet.

Note that it is possible for the image forming apparatus 100A to reverse the recording sheet S after image formation, and then deliver it in this embodiment.

A method of thus reversing and delivering the recording sheet S after image formation is complete is explained next.

The recording sheet S, on which an image is fixed by the fixing portion 207, is first guided to the path 215 by setting the first direction switching member 209 to the solid line direction when reversing and delivering the recording sheet S after image formation. Further, the recording sheet S is transported to the surface reverse path 212 via the path 218 by setting the second direction switching member 217 to the solid line direction and setting the third direction switching member 213 to the dashed line direction.

Then, once the trailing edge of the recording sheet has passed through the second direction switching member 217, the recording sheet S is guided to the path 216 by switching the second direction switching member 217 to the dashed line direction and reversing the direction of rotation of the reversing roller 211. The recording sheet S has its front and back sides reversed and is delivered via the delivery portion 208.

Figure 2:
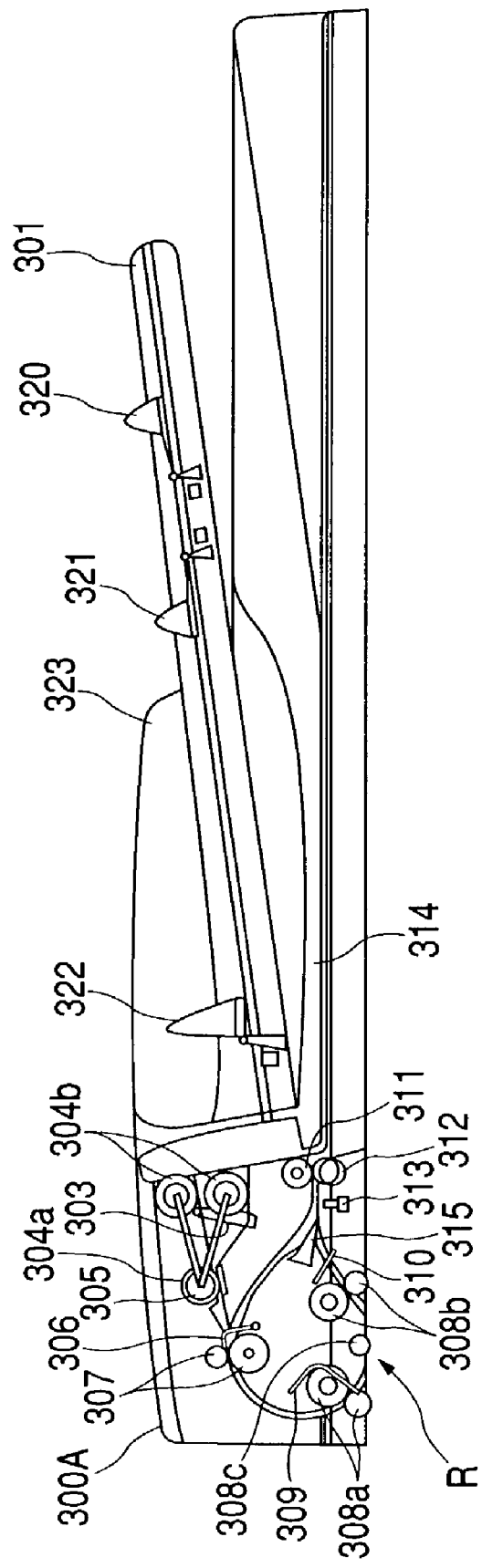
FIG. 2 is a blow-up cross sectional diagram for explaining the structure of the auto document feeder.

On the other hand, FIG. 2 is a blow-up cross sectional diagram for explaining the structure of the ADF 300. Reference numeral 301 in FIG. 2 denotes a document (stacking) tray for setting a document stack, and reference numeral 303 denotes a document set sensor for detecting that a document is set, along with detecting a final document.

A first tray sensor 320 and a second tray sensor 321 are provided in the document (stacking) tray 301, and detect the length of the document in an auxiliary scanning direction. Reference numeral 323 denotes a side regulating plate on the stack tray 301. Note that, although not shown in the figures, a width detecting sensor for detecting the position of the side regulating plate 323 is connected to the side regulating plate 323, and the width detecting sensor makes detection of the document length in a main scanning direction possible.

It is possible to determine the document size by the first tray sensor 320, the second tray sensor 321, and the width detecting sensor 323. Note that reference numeral 322 denotes a pre-cycle end sensor, and this is used in order to forecast the final document.

Further, reference numeral 304a denotes a separation roller, reference numeral 305 denotes a separation pad that is pressed against the separation roller 304a, and reference numeral 304b denotes a pickup roller. The separation roller 304a rotates in the feeding direction if a feed motor 350 shown in FIG. 6, and discussed later, is reversed during document feeding. In addition, the pickup roller 304b moves in response to rotation of the separation roller 304a. The uppermost sheet of the document is transported by the pickup roller 304b moving down from a resting position shown by a solid line onto the document stack, which is shown by a dashed line, to the pressing position while rotating toward the feeding direction.

The uppermost sheet of the document, which has been transported by the pickup roller 304b, is then transported by the separation roller 304a. Note that succeeding sheets are stopped by a checking force from the separation pad 305, which presses against the separation roller 304a, and double feed of the document is thus prevented.

Reference numeral 306 denotes a registration sensor for detecting that the document has been transported by the separation roller 304a, and reference numeral 307 denotes a registration roller. The transported document is made to bump up against the registration roller 307 once, and skew feed correction is performed by stopping the document after forming a predetermined loop.

After skew feed correction is thus performed, the registration roller 307 is made to rotate in the transporting direction by positive rotation of the feed motor 350 at a predetermined timing, and the document is transported. Note that it becomes possible to adjust the amount of loop formation for the skew feed correction, and the adjustment value is not lost, even if the electric power is switched off and on, if stored in a non-volatile memory.

Further, rotation of the pickup roller 304b is stopped by the forward rotation of the feed motor 350, and it moves from its position pressing against the document stack to the resting position. Rotation of the separation roller 304a is simultaneously stopped at this point. However, rotation of the separation roller 304a in the transport direction becomes possible by a one-way mechanism not shown in the figures, and therefore there are no hindrances to document transport.

On the other hand, a document transported by the registration roller 307, which is used as a document feeding portion, for example, is soon detected by the read sensor 309. The document is then transported by read rollers 308a and 308b, which are used as a document transport portion driven by a read motor 316 shown in FIG. 6 and discussed later, for example, and passes through a document reading position R for flow reading of the document.

Note that reference numeral 308c denotes a platen roller for making the document tightly contact the platen glass plate 102 during flow reading of the document. Further, the scanner unit 104, which is used as an image reading portion, for example, moves to a position shown in FIG. 1 during flow reading of the document.

After the read sensor 309 detects the leading edge of the document here, the document is further transported by a predetermined amount. A document edge signal is output to the main body by a serial I/F 903, which is discussed later, at the timing at which the document arrives at the document reading position R. In addition, the document is further transported by a predetermined amount after the trailing edge of the document is detected, and output of the document edge signal is stopped.

Note that it is possible to change the document reading position R in response to position information from the reader portion 100, and it is possible to adjust the document reading position R. An adjustment value is not lost, even if the electric power is switched off and on, if stored in a non-volatile memory.

In addition, delivery or reversal of the document, which has passed through the reading position, is performed by a first delivery reverse roller 311 and a second delivery reverse roller 312.

The read motor 316 drives the first delivery reverse roller 311 here. Further, the second delivery reverse roller 312 is normally in a position shown by a solid line that is separated from the first delivery reverse roller 311. It becomes possible to move the second delivery reverse roller 312 to a position, shown by a dashed line, that presses against the first delivery reverse roller 311 by using a delivery reverse solenoid 324 shown in FIG. 6 and discussed later.

After the document trailing edge passes the reading position, the second delivery reverse roller 312 is pressed against the first delivery reverse roller 311 by the delivery reverse solenoid 324, and the document is transported. Note that reference numeral 310 denotes a delivery reverse sensor, which makes it possible to detect the leading edge and the trailing edge of the transported document. Reference numeral 313 denotes a stamp unit, which is driven by a stamp solenoid 313a shown in FIG. 6 and discussed later. The stamp unit 313 makes it possible to perform stamping processing on the document.

Further, reference numeral 315 denotes a path switching flapper, and the path switching flapper 315 can be pushed down to a lower side by a spring not shown in the figures. By pushing the path switching flapper 315 down, it becomes possible to transport the document in reverse, from the first delivery reverse roller 311 to the register roller 307 side. Further, by rotating the path switching flapper 315 upward, it becomes possible to transport the document from the second read roller 308b side to the first delivery reverse roller 311 side.

Reference numeral 314 denotes a delivery tray, and the document is delivered to the delivery tray and stacked after reading is complete. Note that the open or closed state of a cover 300A of the ADF can be detected by a cover sensor 333 shown in FIG. 6 and discussed later, and the open or closed state of the ADF 300 can be detected by an ADF open and close sensor 335.

Figure 3:
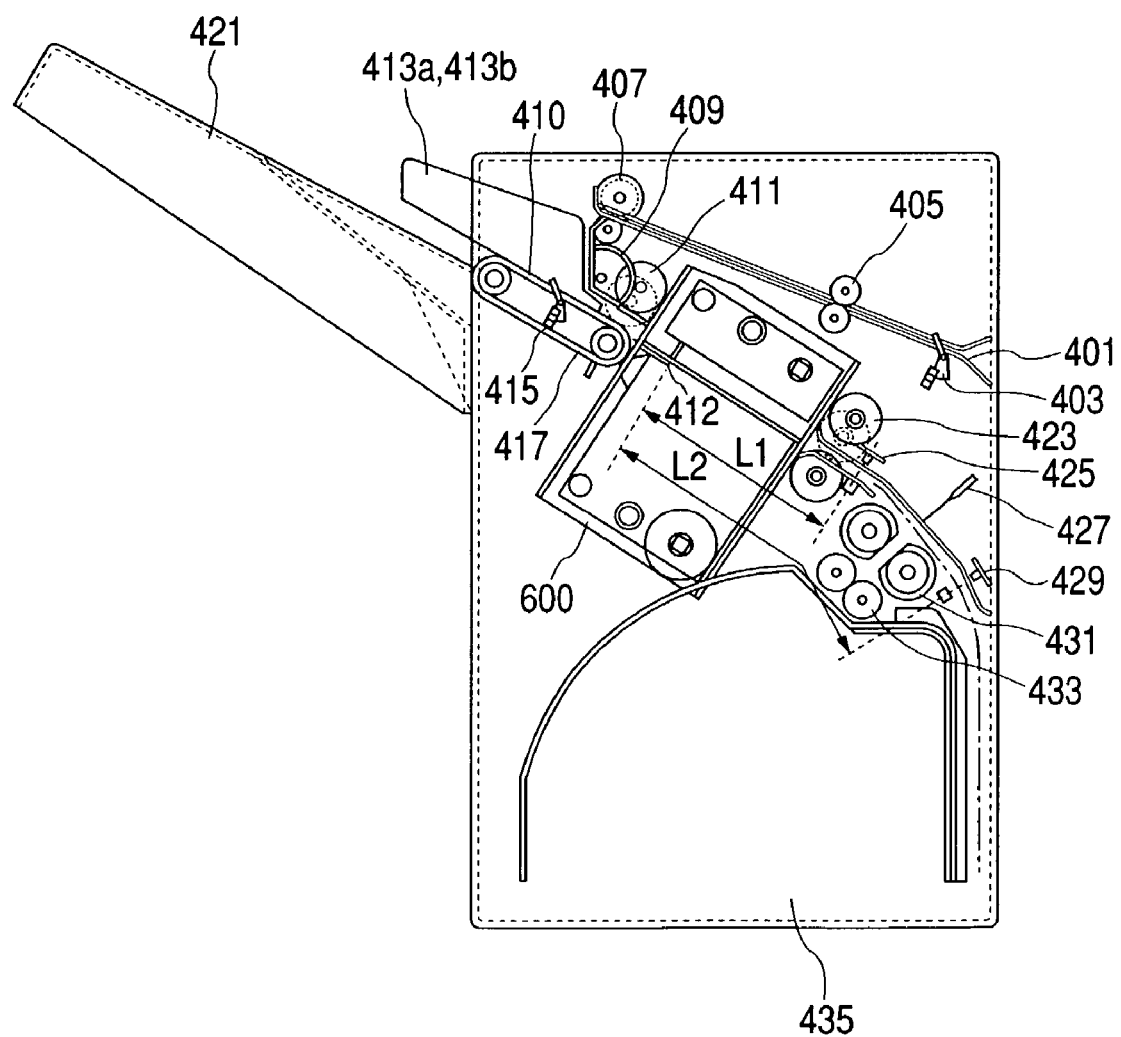
FIG. 3 is a cross sectional diagram showing a structure of a sheet treating apparatus provided to the image forming apparatus.

FIG. 3 is a cross sectional diagram showing the structure of a sheet treating apparatus 400. The sheet treating apparatus 400 has a stapler for stapling operations, and a folding function for folding the recording sheets S in half, in addition to a sorting operation for sorting sheets in this embodiment. Saddle stitch operations can be performed by performing stapling and folding operations to a center portion of the recording sheet S.

Reference numeral 401 in FIG. 3 denotes a sheet receiving portion for receiving sheets delivered form the printer portion 200, and reference numeral 403 denotes an entrance sensor that performs detection of sheets received by the sheet receiving portion 401. The received sheets are transported by a transport roller 405 and a deliver roller 407, which are driven by a transport motor not shown in the figures, and delivered upon an intermediate tray 410. The delivered sheets are returned to a shutter 412 by a paddle 409 that is driven by a paddle motor not shown in the figures.

Reference numeral 415 denotes a stack delivery sensor for detecting sheets on the intermediate tray 410. If the sheets are detected by the stack delivery sensor 415, then a matching operation for aligning edges of the recording sheets S is performed by aligning members 413a and 413b. The sheets that have been delivered in order are thus aligned on the intermediate tray 410, and made into a sheet stack.

After the sheet stack is formed, it is stapled together by a stapling unit 600. The sheet stack is then held by lowering a stack roller 411, which is capable of upward and downward motion, into a state shown by a dashed line in the figure by driving the paddle motor to rotate in a direction that is the reverse of the paddle drive direction. The trailing edge of the sheet stack is pushed by the stack roller 411 and a stack delivery belt 417, which are driven by a delivery motor not shown in the figure. The stack is thus delivered onto a tray 421.

Note that the stack roller 411 is structured by a sponge roller so as not to disturb the aligned stack during stack delivery. Further, the delivery motor uses a stepping motor in order to accurately perform position control.

Figure 4:
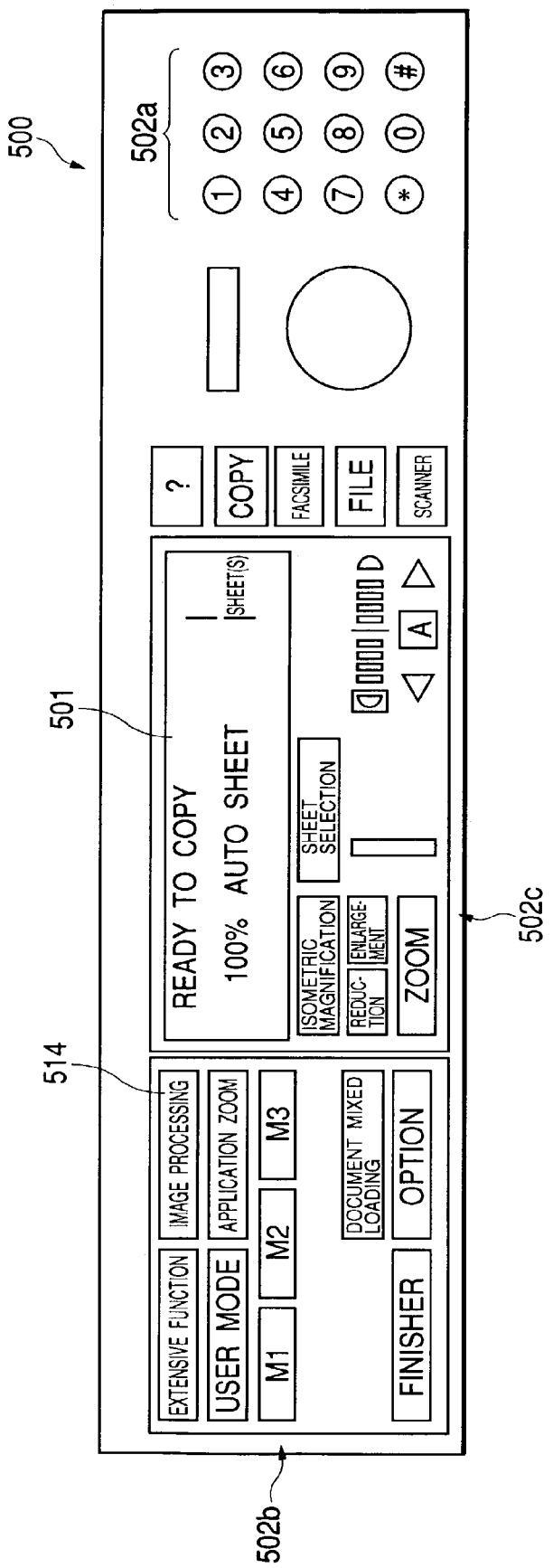
FIG. 4 is a diagram showing an arrangement structure of operational and display panels provided to the image forming apparatus.

FIG. 4 is a diagram showing the arrangement structure of an operation and display panel 500 provided on an upper surface of the reader portion 100. Note that the operation and display panel 500 includes keys 502a, 502b, and 502c, and an LCD display unit 501 capable of displaying the keys.

Figure 5:
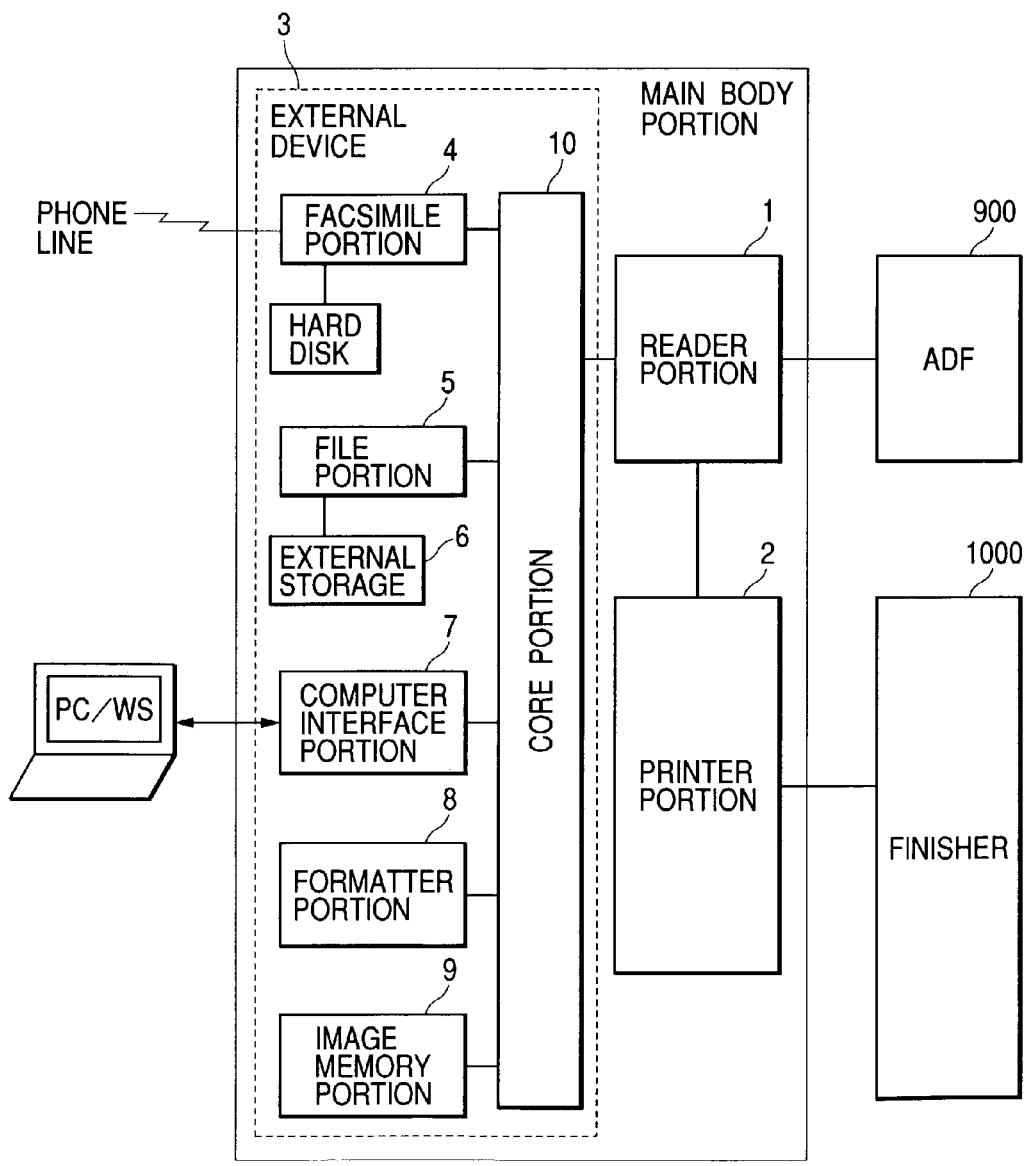
FIG. 5 is a block diagram showing an overall system structure of the image forming apparatus.

FIG. 5 is a block diagram showing the structure of the overall system of the image forming apparatus 100A. In FIG. 5, reference numeral 1 denotes a control portion of the reader portion 100, reference numeral 2 denotes a control portion of the printer portion 200, and reference numeral 3 denotes a control portion of the external apparatus 250. Reference numeral 900 denotes a control portion of the ADF 300, and reference numeral 1000 denotes a control portion of the finisher 400. The control portions perform data exchange by a bus, serial communication, or the like, and operate in synchronization with each other.

Data sent from the reader portion 100 to the ADF 300 includes a feed signal that promotes feeding of documents stacked in the ADF 300, a delivery signal that promotes delivery of the documents after reading is complete, and a feed/delivery mode signal that determines whether to feed or deliver the document. Further, data sent from the image forming apparatus main body 100B to the finisher 400 includes an image forming mode (copying function, printer function, and the like) signal, a mode signal stored in the finisher 400, size of sheets to be accommodated, timing signals, and the like.

Data indicating which functions of the external apparatus 250 are used for operations is transmitted through communications from the reader portion 100 and the printer portion 200 to the ADF 300 and the sheet post-processing apparatus 400 when operations are performed.

The control portion 3 of the external apparatus 250 is connected to the control portion 1 of the reader portion 100 by a cable. Inside the control portion 3 structured are a facsimile portion 4 that transmits and receives facsimiles; a file portion 5 for converting various types of document information to electric signals and storing the electric signals on a magneto-optical disk; a formatter portion 8 for expanding code information from a computer into image information; a computer interface portion 7 that performs interfacing operations with an external computer; an image memory portion 9 for temporarily accumulating information from the reader portion 100 and information sent from the computer; and a core portion 10 for controlling each of the above functions.

Figure 6:
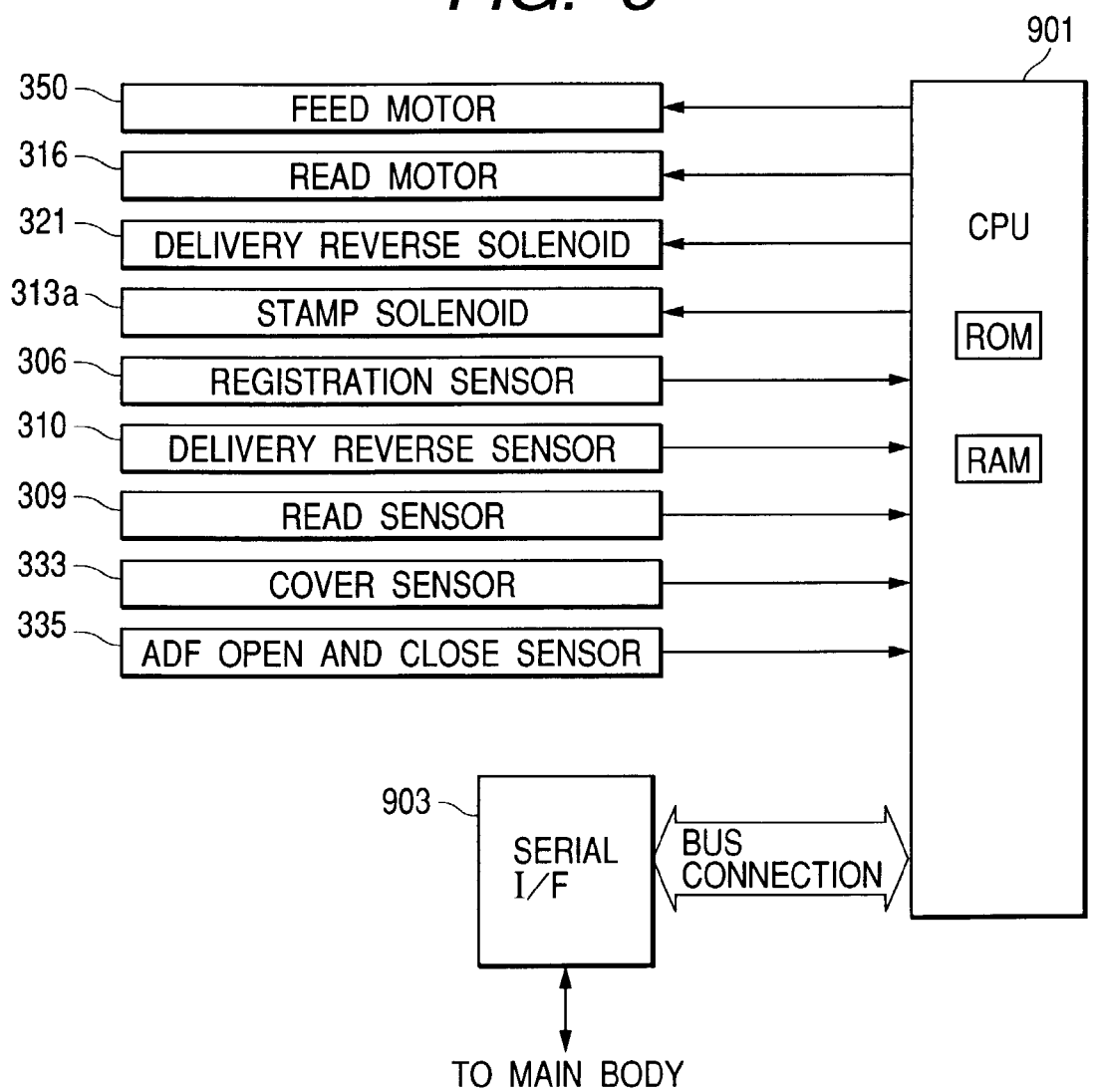
FIG. 6 is a block diagram showing a circuit structure of a control portion of the auto document feeder.

Further, FIG. 6 is a block diagram showing the circuit structure of the control portion 900 of the ADF 300, and reference numeral 901 in FIG. 6 denotes a CPU (central processing unit). A ROM (read only memory) for storing control programs corresponding to control flow and the like of FIG. 12, and a RAM (random access memory) for storing input data and working data are built into the CPU 901.

Further, various types of motors, such as the feed motor 350 and the read motor 316 and various types of solenoids, such as delivery reverse solenoid 324 and a stamp solenoid 313a are connected to output ports of the CPU 901. The registration sensor 306, the delivery reverse sensor 310, the read sensor 309, the cover sensor 333, and the like are connected to input ports of the CPU 901. The CPU 901 controls each component in accordance with a control program stored in the ROM.

Note that reference numeral 903 denotes a serial I/F (interface) that performs serial communication with the control portion 1 of the reader portion 100. The serial I/F 903 performs the transmission/reception of control data to/from the reader portion 100. Data received by the ADF 300 from the reader portion 100 includes document feed signals and the like listed in the control flow shown in FIG. 12. Data sent from the ADF 300 to the reader portion 100 includes the feed completion signals that indicate that feeding of the document is complete, document edge signals, and the like.

Document transporting control operations of the control portion 900 during image reading, for example, are explained as a control portion of the ADF 300. First, document transporting control operations during image reading of a one-side document are explained by using FIGS. 7A to 7E, and FIGS. 8A to 8D.

Figure 7A:
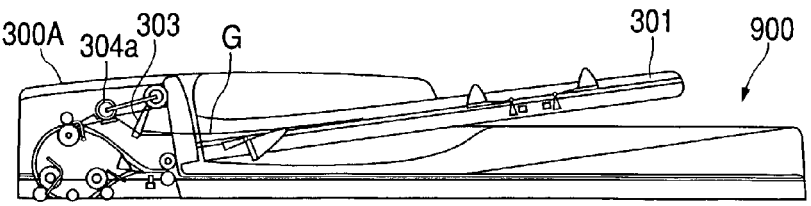
FIGS. 7A, 7B, 7C, 7D, and 7E are diagrams for explaining document transporting control operations in the auto document feeder during image reading of a one-side document.

First, as shown in FIG. 7A, if the ADF cover 300A can be confirmed as being closed by the cover sensor 333 (refer to FIG. 6), and if the ADF 300 can be confirmed as being closed by an ADF open and close sensor 335, and further, if a document G is detected as being set on the document stack tray 301 by the document set sensor 303, then a "ready signal", which indicates that the ADF 300 can perform feed operations, is sent to the reader portion 100.

Figure 7B:
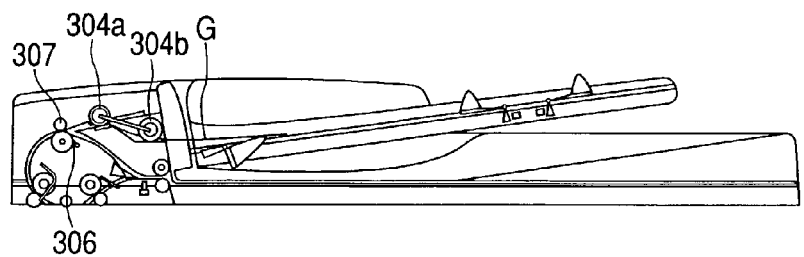

Next, the feed motor 350 (refer to FIG. 6) is rotated in reverse if a "document feed signal", which indicates that feed operations of the document G are started, is received from the reader portion 100, which itself has received the "ready signal". The separation roller 304a thus rotates in the feed direction, and the pickup roller 304b moves from its resting position to a position at which the roller comes into press contact with the document stack while rotating toward the feed direction, as shown in FIG. 7B. Feed operations of the document G are thus started.

Note that the feed motor 350 is stopped after transporting the document G by a predetermined amount if the registration sensor 306 detects the document G after feed operations have begun. A loop is formed in the leading edge of the document by thus making the transported amount of the document after the document detection larger than the distance between "the document detection position by the registration sensor 306 and the position of the registration roller 307" here. Skew feed correction is thus performed.

Figure 7C:
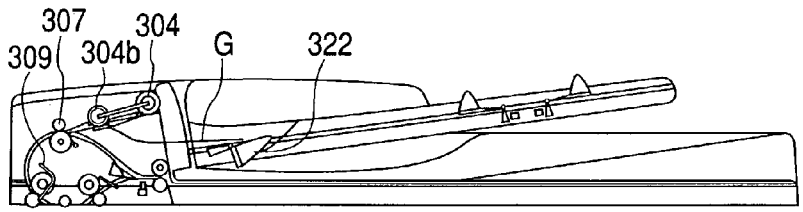

Next, the read motor 316 (refer to FIG. 6) is rotated normally and at the same time, the feed motor 350 is rotated normally, so that the registration roller 307 is made to rotate in the feed direction. The document G that undergoes the skew feed correction is thus transported as shown in FIG. 7C. Note that the pickup roller 304b stops rotation in the feed direction in accordance with normal rotation of the feed motor 350, and moves from a position at which the roller is in a press contact with the document stack to the standby position. Further, the separation roller 304b also stops rotating in the feed direction, but the separation roller 304b is provided with a one-way mechanism as already stated, and therefore there are no hindrances to document transport.

Figure 7D:
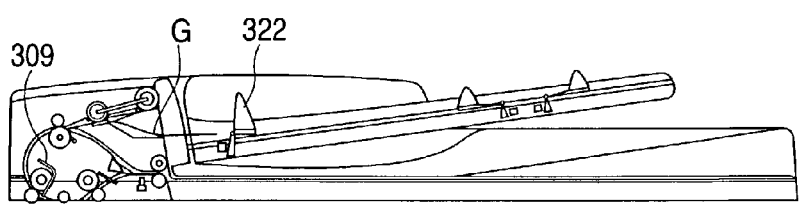

A prediction is made by the pre-cycle end sensor 322 as to whether or not the document G that is being transported is the final document when the read sensor 309 detects the leading edge of the document G for cases in which the document G is small in size, and this forecast is sent to the reader portion 100. That is, the pre-cycle end sensor 322 sends a "non-final document prediction signal" for "document present", and sends a "final document prediction signal" for "document not present", to the reader portion 100 as shown in FIG. 7D.

Figure 7E:
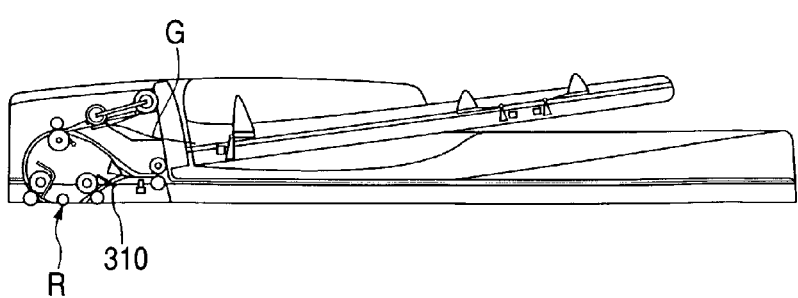

On the other hand, after the document G is detected by the read sensor 309 and transported by a predetermined amount, the document G is then temporarily stopped at the initial feed position, which is a standby position, as shown in FIG. 7E by stopping the read motor 316 and the feed motor 350. A "feed completion signal" which indicates that the document G has arrived at the initial feed position, in other words, that feeding is complete, is transmitted to the reader portion 100.

If image reading operations become possible by the scanner unit 104 after the reader portion 100 receives the "feed completion signal", the reader portion 100 functions as a detecting portion for detecting that the scanner unit 104 is in an image readable state and transmits a "document feed signal", which indicates that reading of the document G should be started, to the ADF 300 as a detection signal.

The ADF 300, which has received the "document feed signal" as the detection signal, determines that the scanner unit 104 is in an image readable state, makes the read motor 316 and the feed motor 350 rotate normally, restarts transport of the document G, and transports the document G to the document reading position R.

That is, in general, after the document G is temporarily stopped at the initial feed position by stopping the read motor 316 and the feed motor 350, transport of the document G is restarted by receiving the "document feed signal" from the reader portion 100, and the document G is transported to the document reading position R when reading document images.

Note that there are cases in which processing of the previously read document G finishes sooner than a predetermined processing time, for example. As a result, the "document feed signal" may be received before the document G arrives at the initial feed position, as discussed later. In this case, the document G is transported to the document reading position R without being stopped temporarily at the initial feed position.

The number of documents to be processed can be increased by thus transporting the document G to the document reading position R without stopping temporarily it at the initial feed position, and it is possible to dispense with an operation of setting the transport speed higher or lower during document transport. Document transport operations can thus be stabilized.

Subsequently, once the leading edge of the document G arrives at the document reading position R as shown in FIG. 7E, a "reading start signal" for promoting the start of document reading is sent to the reader portion 100.

Figure 8A:
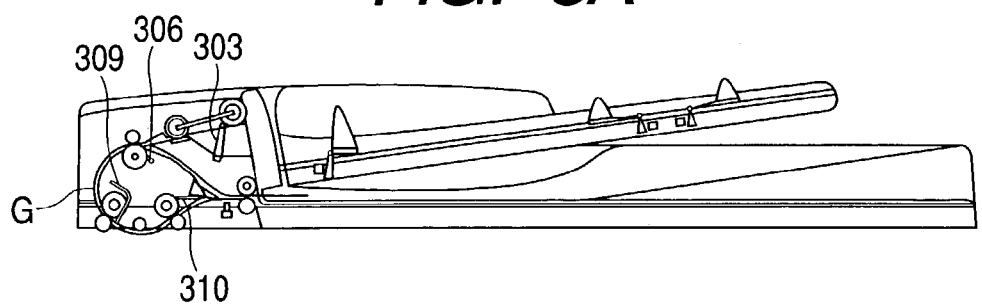
FIGS. 8A, 8B, 8C, and 8D are diagrams for explaining document transporting control operations in the auto document feeder during image reading of a one-side document.

The delivery reverse sensor 310 then detects the document G, and in addition, it is waited for the registration sensor 306 to detect the trailing edge of the document. A determination of whether or not this document is the final document is made by the document set sensor 303 after the registration sensor 306 detects the trailing edge of the document. That is, the document set sensor 303 sends a "non-final document signal" to the reader portion 100 for "document present", and sends a "final document signal" to the reader portion 100 for "document not present" when the registration sensor 306 detects the trailing edge of the document, as shown in FIG. 8A.

Further, the feed motor 350 is rotated normally for cases in which the document is judged as the non-final document, and feed operations on the next document are started. The feed motor 350 is stopped for cases in which the document is determined to be the final document.

Figure 8B:
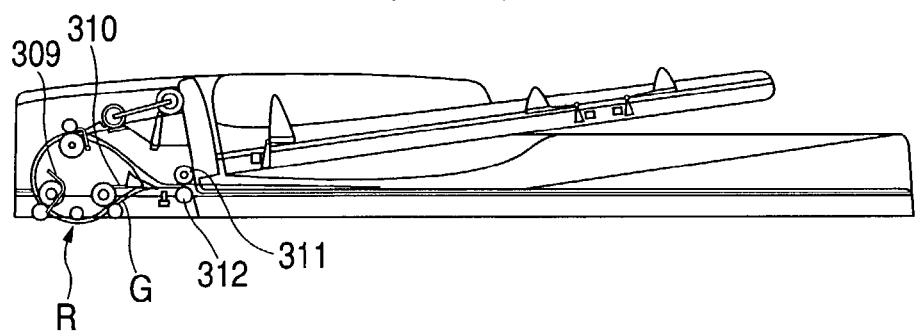

Then, it is waited for the read sensor 309 to detect the trailing edge of the document G. The document G is transported by a predetermined amount after the read sensor 309 detects the trailing edge of the document G. A "reading completion signal" for promoting the completion of document reading is transmitted once the trailing edge of the document reaches the document reading position R, as shown in FIG. 8B. Further, at this point, the delivery reverse solenoid 324 (refer to FIG. 6) is driven, the second delivery reverse roller 312 is pressed against the first delivery reverse roller 311, structuring a delivery reverse roller pair, and the transporting force is maintained.

Figure 8C:
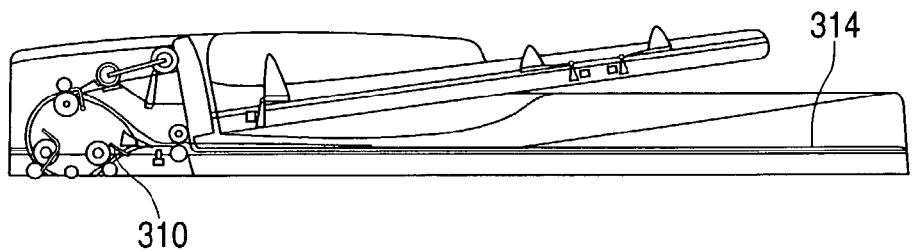

It is waited for the delivery reverse sensor 310 to detect the trailing edge of the document. As shown in FIG. 8C, the read motor 316 is stopped when the document trailing edge passes through the delivery reverse sensor 310 and this is detected by the delivery reverse sensor 310, and the read motor 316 is stopped to wait for a "document delivery signal" to be sent from the reader portion 100, which indicates that delivery operations on the document G are started. When the "document delivery signal" is received, the read motor 316 is restarted and transport of the document G is then restarted.

Figure 8D:
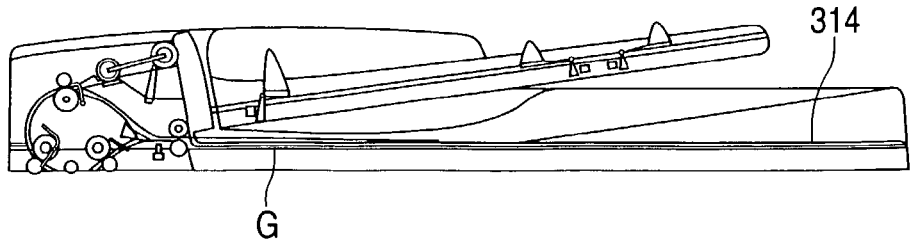

The documents G can thus be surely stacked onto the delivery tray 314 as shown in FIG. 8D by transporting the document by an amount of document from an "off position of the delivery reverse sensor to the delivery roller"+ a predetermined amount after the detection of the document trailing edge by the delivery reverse sensor 310. Note that sequential operations are completed by stopping the read motor 316 after the documents G are stacked onto the delivery tray 314, and stopping driving of the delivery reverse solenoid 324.

Document transporting control operations during image reading of a two-side document are explained next using FIGS. 9A to 9E, FIGS. 10A to 10E, and FIGS. 11A and 11B. It is waited for the read sensor 309 to detect the trailing edge of the document G. The document G is then transported by a predetermined amount after the read sensor 309 detects the trailing edge of the document G in this case. A "reading completion signal" that promotes the completion of the document reading is transmitted once the trailing edge of the document arrives at the document reading position R as shown in FIG. 8B, which is discussed above. Note that control operations up to this point are the same as those of the one-side document, and therefore their explanations are omitted here.

Figure 9A:
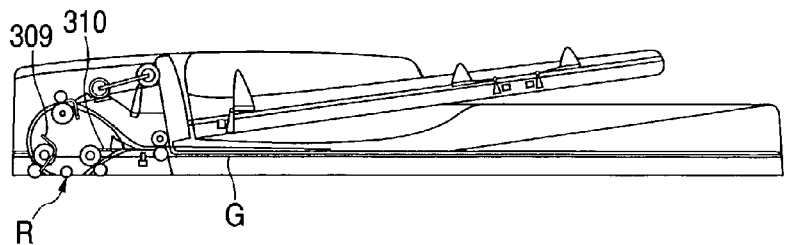
FIGS. 9A, 9B, 9C, 9D, and 9E are diagrams for explaining document transporting control operations in the auto document feeder during image reading of a two-side document.
Figure 9B:
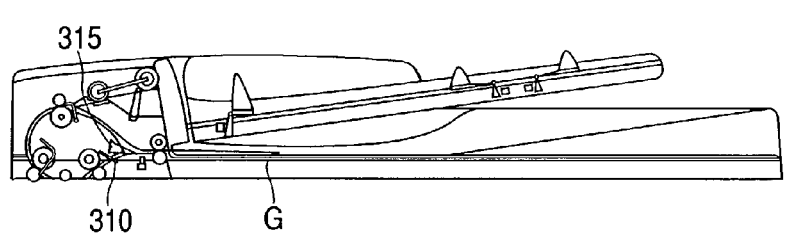

First, once the delivery reverse sensor 310 detects the document trailing edge after the document trailing edge arrives at the document reading position R as shown in FIG. 9A, the document G is transported by a predetermined amount up to a document reversing position, as shown in FIG. 9B. The read motor 316 is then stopped, and the document G is temporarily stopped. Note that the document reversing position is a position at which the document trailing edge has passed a switching position of a path switching flapper 315.

Figure 9C:
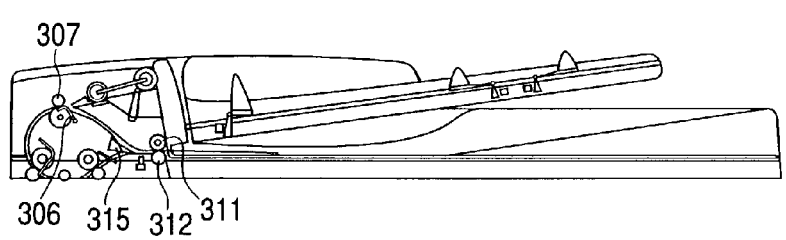

After the read motor 316 is thus stopped temporarily, the document G is transported in reverse by reversely rotating the read motor 316. The document G thus transported in reverse is transported to the registration roller 307 side by the path switching flapper 315, as shown in FIG. 9C. The read motor 316 is stopped once the leading edge of the document G is detected by the registration sensor 306 and the document G is transported by a predetermined amount after the detection of its leading edge.

Note that a loop is formed in the document leading edge by making the transported amount after detection of the document G larger than the distance from "the document detection position of the registration sensor 306 to the registration roller 307 position". Skew feed correction is thus performed.

Figure 9D:
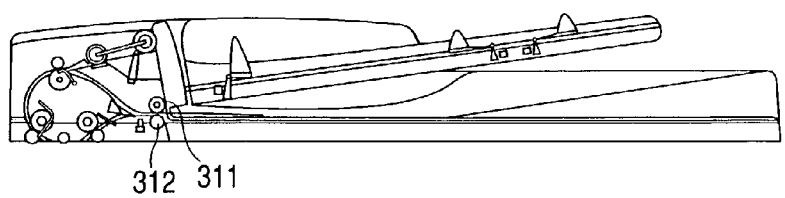

Next, the feed motor 350 is rotated normally and at the same time, the read motor 316 is made to rotate in reverse, so that the document G is again transported. After the document G is then transported by a predetermined amount, operation of the delivery reverse solenoid 324 is stopped, and the second delivery reverse roller 312 is separated from the first delivery reverse roller 311 as shown in FIG. 9D. Note that the predetermined amount at this point corresponds to a distance at which the registration roller 307 can reliably nip the leading edge of the document G, and transport becomes possible. Further, the read motor 316 is simultaneously driven in the normal rotation direction after being stopped.

The read sensor 309 next detects the leading edge of the document G, and the document G is temporarily stopped at the initial feed position by stopping the read motor 316 and the feed motor 350 after the document G is transported by a predetermined amount. Then, the "feed completion signal" indicative of the completion of feeding the document G is sent to the reader potion 100. After the reader portion 100 receives the "feed completion signal", and image reading operations become possible, a "document feed signal" that indicates that reading of the document G should be started is sent to the ADF 300.

Figure 9E:
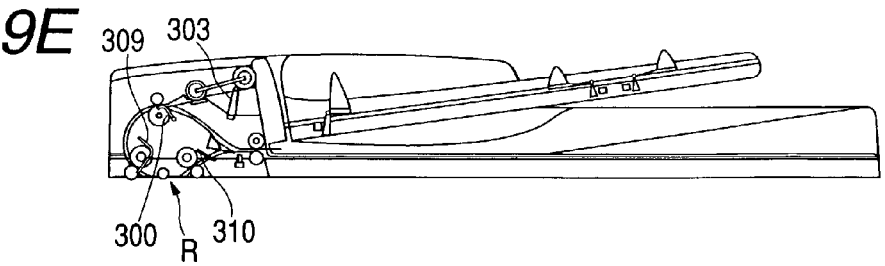

The ADF 300, which has received the "document feed signal", then makes the read motor 316 and the feed motor 350 rotate normally, and transport of the document G is restarted. Once the leading edge of the document G arrives at the document reading position R as shown in FIG. 9E, a "reading start signal" for promoting the start of image reading is sent to the reader portion 100.

Figure 10A:
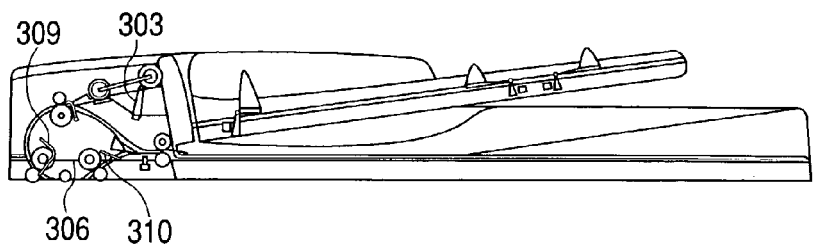
FIGS. 10A, 10B, 10C, 10D, and 10E are diagrams for explaining document transporting control operations in the auto document feeder during image reading of a two-side document.

The delivery reverse sensor 310 then detects the document G, and in addition, it is waited for the registration sensor 306 to detect the trailing edge of the document. A determination of whether or not this document is the final document is made by the document set sensor 303 after the registration sensor 306 detects the trailing edge of the document. That is, the document set sensor 303 sends a "non-final document signal" to the reader portion 100 for "document present", and sends a "final document signal" to the reader portion 100 for "document not present" when the registration sensor 306 detects the document trailing edge, as shown in FIG. 10A.

Further, the feed motor 350 is rotated reversely for cases in which the document is judged as the non-final document, and feed operations on the next document are started. The feed motor 350 is stopped for cases in which the document is determined to be the final document.

Figure 10B:
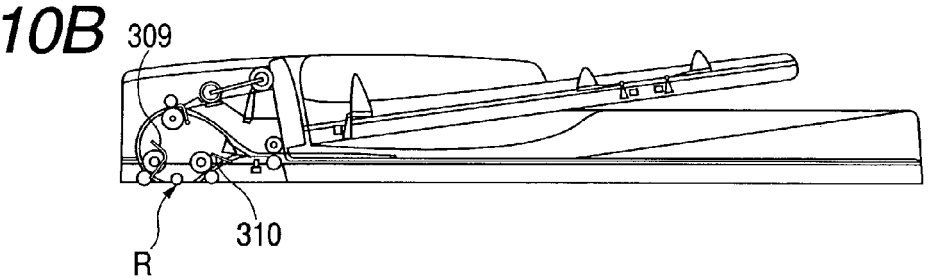

Then, it is waited for the read sensor 309 to detect the trailing edge of the document G. The document G is transported by a predetermined amount after the read sensor 309 detects the trailing edge of the document G. A "reading completion signal" for promoting the completion of image reading is transmitted once the trailing edge of the document reaches the document reading position R, as shown in FIG. 10B.

Further, at this point the delivery reverse solenoid 324 (refer to FIG. 6) is driven, the second delivery reverse roller 312 is pressed against the first delivery reverse roller 311, structuring a delivery reverse roller pair, and the transporting force is maintained.

Figure 10C:
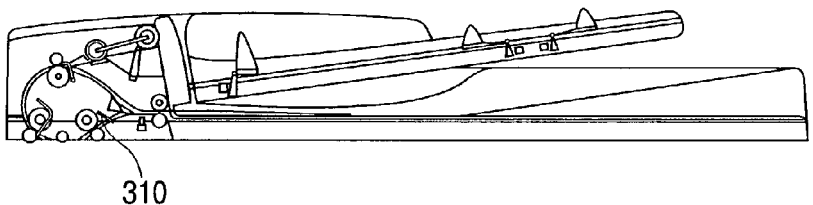

A document reversing operation is performed next in order to align the documents in page order on the delivery tray. Thus, it is waited for the delivery reverse sensor 310 to detect the trailing edge of the document. Once the trailing edge of the document passes the delivery reverse sensor 310 as shown in FIG. 10C, and the delivery reverse sensor 310 detects this, the read motor 316 is stopped, so that the document G is temporarily stopped. Note that a document reversing position is the position at which the trailing edge of the document passes the switching position of the path switching flapper 315.

Figure 10D:
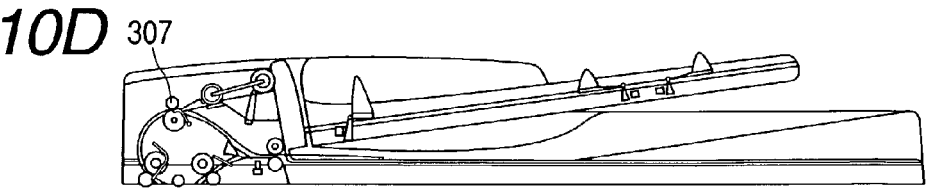

The document G is next transported in reverse by rotating the read motor 316 in reverse after thus temporarily stopping the read motor 316. The document G, thus transported in reverse, is then transported to the registration roller 307 side as shown in FIG. 10D by the path switching flapper 315.

Figure 10E:
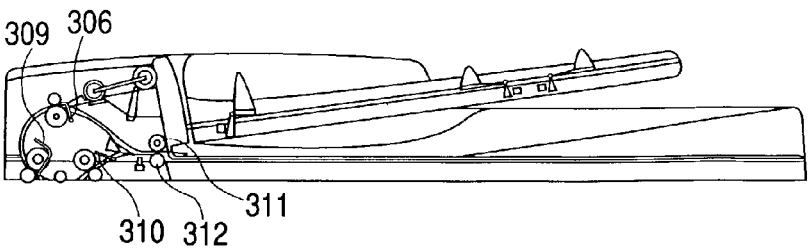

When the registration sensor 306 detects the leading edge of the document G, driving of the delivery reverse solenoid 324 is stopped after the document G is transported by a predetermined amount after the document leading edge detection, and the second delivery reverse roller 312 is separated from the first delivery reverse roller 311 as shown in FIG. 10E. Note that the predetermined amount at this point is set to a distance such that the registration roller 307 can reliably nip the leading edge of the document G, and document transport becomes possible. Further, after simultaneously stopping the read motor 316, it is driven in the normal rotation direction.

Next, it is waited for the read sensor 309 and the delivery reverse sensor 310 to detect the leading edge of the document G in order, and further, for the registration sensor 306 to detect the trailing edge of the document. When the registration sensor 306 detects the trailing edge of the document, if the document is not the final document, the feed motor 350 is rotated in reverse and feed operations of the next document G are started. Although not shown in the figures, the feed motor 350 is stopped for cases in which the document is the final document.

Figure 11A:
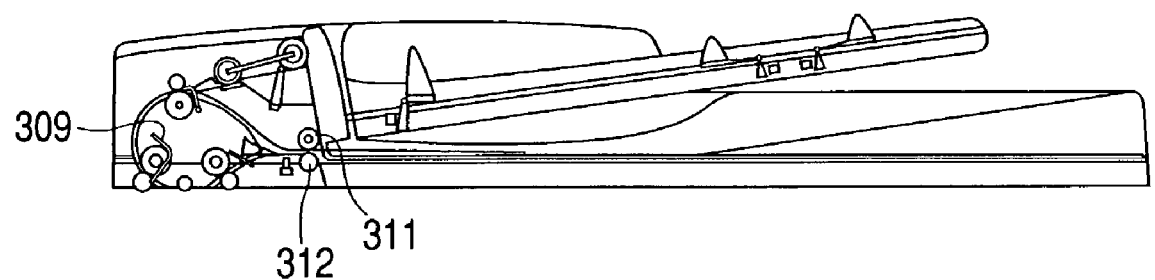
FIGS. 11A and 11B are diagrams for explaining document transporting control operations in the auto document feeder during image reading of a two-side document.

Subsequently, it is waited for the read sensor 309 to detect the trailing edge of the document G. The delivery reverse solenoid 324 is driven once the read sensor 309 detects the trailing edge of the document G, and the second delivery reverse roller 312 is pressed against the first delivery reverse roller 311 as shown in FIG. 11A, forming a delivery reverse roller pair, and the transporting force is maintained.

Figure 11B:
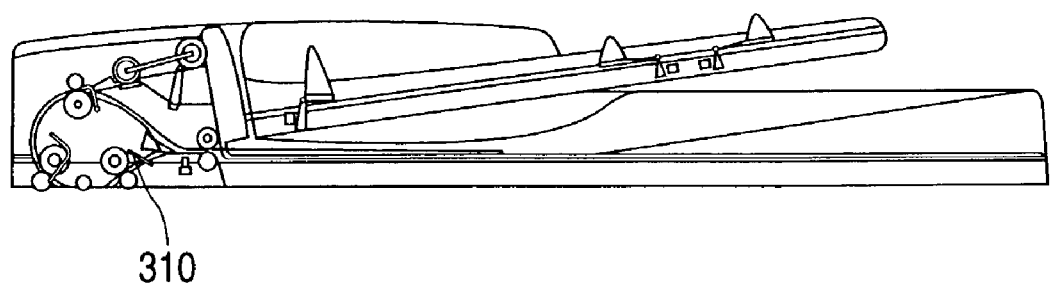

Next, it is waited for the delivery reverse sensor 310 to detect the trailing edge of the document. The read motor 316 is stopped when, as shown in FIG. 11B, the document trailing edge passes through the delivery reverse sensor 310 and this is detected by the delivery reverse sensor 310, and then a "document delivery signal" from the reader portion 100 indicating that delivery operations on the document G are started is waited. When the "document delivery signal" is received, the read motor 316 is restarted and transport of the document G is then restarted.

The documents G can thus be accurately stacked onto the delivery tray 314 by transporting the document by an amount thereof from an "off position of the delivery reverse sensor to the delivery roller"+ a predetermined amount after the detection of the document trailing edge by the delivery reverse sensor 310. Note that sequential operations are completed by stopping the read motor 316 after the documents G are stacked onto the delivery tray 314, and stopping driving of the delivery reverse solenoid 324.

For cases of reading a document image as already discussed, normally the document G is temporarily stopped at the initial feed position by stopping the read motor 316 and the feed motor 350 in general. Transport of the document G is then restarted by receiving a "document feed signal" from the reader portion 100, and the document is transported to the document reading position R.

The "document feed signal" is a signal output when the scanner unit 104 is fixed to a predetermined position for document reading, that is, when it reaches a so-called flow reading position. That is, the signal is not output until the scanner unit 104 arrives at the predetermined position and image reading becomes possible.

However, it is not necessary to wait for the "document feed signal" after the scanner unit 104 once arrives at the predetermined position. In this embodiment, a determination is made before the document G arrives at the initial feed position as to whether or not scanner unit 104 has already arrived at the predetermined position based on whether or not the "document feed signal" has been received. If it is determined that image reading is possible, the document is not stopped, and the transport thereof continues as it is.

This kind of control, which corresponds to the main points of the present invention, is explained next by using the flowchart shown in FIG. 12 and further, referring to the explanation of document transporting control operations during image reading of a one-side document, which have already been discussed using FIGS. 7A to 7E and FIGS. 8A to 8D.

First, when a document feed signal, which requests feed operations for feeding the document G to the initial feed position, is input from the reader portion 100 in STEP 2001, the CPU 901 of the control portion 900 of the ADF 300 operates the feed motor 350 to start the series of document feed operations in STEP 2002, as already discussed in the explanation of document transporting control operations during image reading of a one-side document using FIGS. 7A to 7E and FIGS. 8A to 8D.

A determination is made next in STEP 2003 as to whether or not the fed document has arrived at the initial feed position. The CPU 901 makes a judgement based on information of the read sensor 309, a memory stored in the CPU 901, and the like. That is, the CPU 901 determines that the document has arrived when the document has been transported by a predetermined amount after the read sensor 309 detects the document G, and determines that the document has not arrived if it has not been transported by the predetermined amount.

The document G is temporarily stopped at the initial feed position in STEP 2010 when it arrives at the initial feed position. If the document feed signal is once again input from the reader portion 100 in STEP 2011 as a detection signal for detecting that the scanner unit 104 has been put in an image readable state, processing advances to STEP 2012 and document transport operation is started. The reader portion 100 performs document image reading operations while the document is being transported.

On the other hand, until the document arrives at the initial feed position, a determination is made in STEP 2004 as to whether or not the document feed signal is input again. If processing of the document G is finished earlier than a predetermined amount of processing time, for example, and the document feed signal is input from the reader portion 100 as a detection signal for detecting that the scanner unit 104 is in an image readable state before the document G has arrived at the initial feed position, then the CPU 901 determines whether or not the document has arrived at the initial feed position in STEP 2005, similar to the determination discussed above.

If the document has arrived at the initial feed position, the document G is not stopped and, as already discussed in the explanation of document transporting control operations during image reading of a one-side document using FIGS. 7A to 7E and FIGS. 8A to 8D, the series of document transport operations subsequent to the operation of transporting the document G to the document reading position R continue in STEP 2006. The reader portion 100 performs document image reading operations during document transport operations.

After that, in STEP 2007, the completion of the series of document transport operations is waited. That is, as shown in FIG. 8D and already discussed, the CPU 901 determines whether or not document transporting is complete by using information on the document trailing edge detection signal from the delivery reverse sensor 310, the document delivery signal from the reader portion 100, and the like after the series of operations. If document transport is complete, then the documents G are transported and stacked on the delivery tray 314. Document transport operations are then stopped and processing is finished.

An increase in the number of documents processed can thus be achieved, and document transport operations can be stabilized because it is possible to dispense with an operation of setting the transport speed higher or lower during document transport, by transporting the document without stopping the document when it is determined that image reading is possible before the document G has arrived at the initial feed position.

Figure 12:
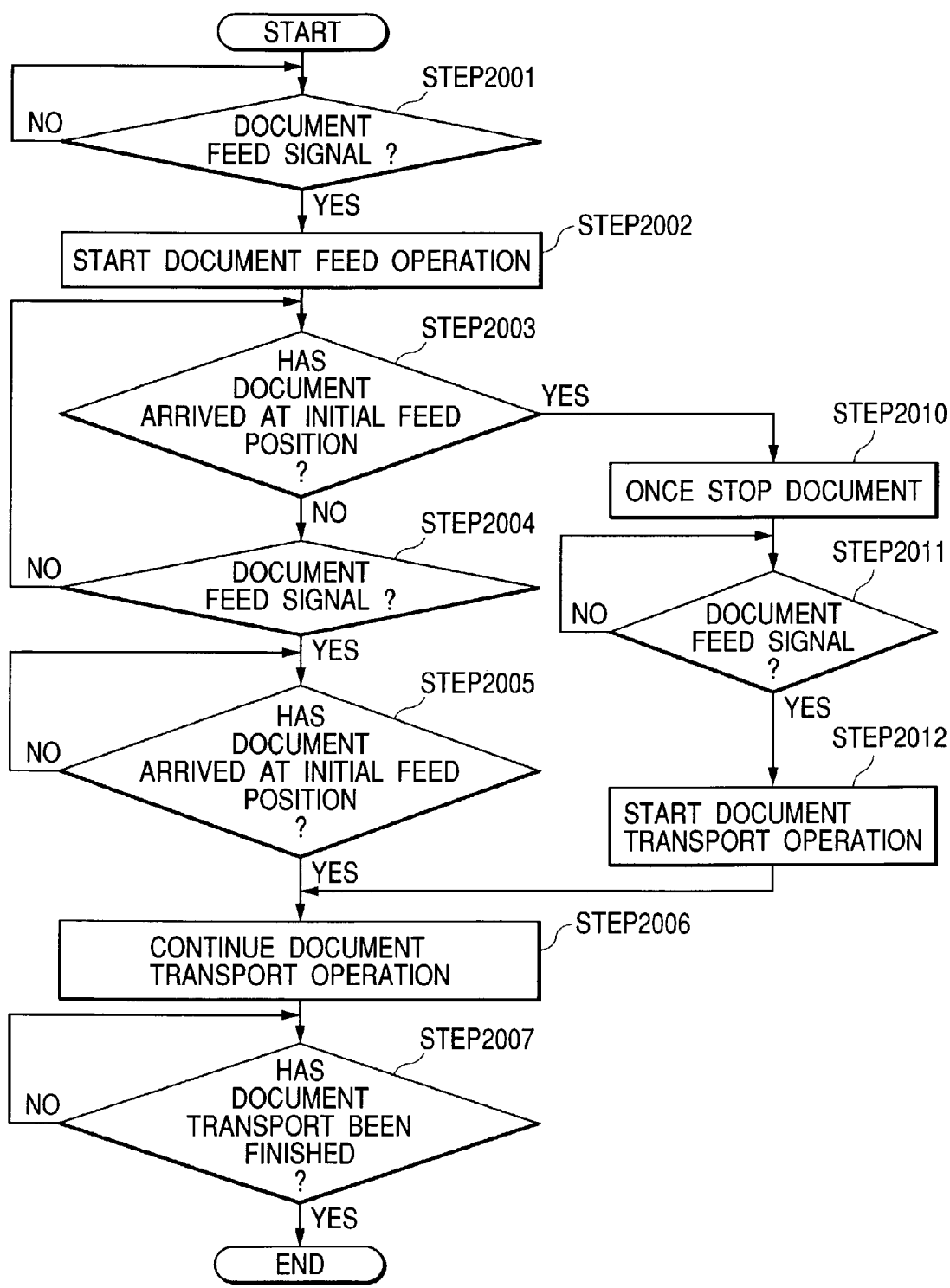
FIG. 12 is a flowchart showing document transporting control operations in the auto document feeder.

Note that, as already discussed, although the CPU 901 of the control portion 900 of the ADF 300 controls each portion as the control position in accordance with various control programs corresponding to the flowchart shown in FIG. 12 in the embodiments of the present invention, a structure in which a control portion of a main body portion of the image forming apparatus directly controls each portion may also be used.

As explained above, in accordance with one embodiment of the present invention, the number of documents processed can be increased, and the document transport operations can be stabilized, by transporting the documents to the document reading position R, without stopping at the initial feed position, for cases in which an image readable state is detected by the time the document arrives at the initial feed position.

Further, by stopping the document at the initial feed position for cases in which the document readable state is not detected by the time the document arrives at the initial feed position, and by transporting the document to the document reading position R, without stopping the document at the initial feed position, for cases in which the image readable state is detected by the time the document reaches the initial feed position, an increase in the number of documents processed can be achieved, and the document transport operations can be stabilized.

What is claimed is:

1. A document feeder for transporting a document to a predetermined reading position at which image reading is performed by an image reading portion, comprising:
   a sensor disposed between a document stacking portion and the predetermined reading position for detecting a leading edge of a document fed from the document stacking portion toward the predetermined reading position;
   a document transport portion for transporting the document to a reading standby position upstream of the reading position based on a detection result of the sensor; and
   a control portion for controlling the document transport portion so that:
      the document is made to stop at the reading standby position if the control portion does not receive a signal representing that the image reading portion is in an image readable state from a detecting portion for detecting that the image reading portion is in an image readable state by the time the document arrives at the reading standby position after a transport of the document is started by the document transport portion; and
      the document is transported to the reading position, without being made to stop at the reading standby position, if the control portion receives the signal from the detecting portion by the time the document arrives at the reading standby position after a transport of the document is started by the document transport portion.

2. A document feeder according to claim 1, wherein:
   the control portion makes the document transport portion to transport the document during document image reading so as to pass above the image reading portion, which is in a state of being stopped at a predetermined position.

3. An image forming apparatus comprising:
   an image reading portion for reading an image of a document at a predetermined reading position;
   a sensor disposed between a document stacking portion and the predetermined reading position for detecting a leading edge of a document fed from the document stacking portion toward the predetermined reading position;
   a document transport portion for transporting the document to a reading standby position upstream of the reading position based on a detection result of the sensor;
   a detecting portion for detecting that the image reading portion is in an image readable state and outputting a signal representing that the image reading portion is in the image readable state; and
   a control portion for controlling the document transport portion so that:
      the document is made to stop at the reading standby position if the control portion does not receive the signal from the detecting portion by the time the document arrives at the reading standby position after a transport of the document is started by the document transport portion; and the document is transported to the reading position, without being made to stop at the reading standby position, if the control portion receives the signal from the detecting portion by the time the document arrives at the reading standby position after a transport of the document is started by the document transport portion.

4. An image forming apparatus according to claim 3, wherein:

the control portion makes the document transport portion to transport the document during document image reading so as to pass above the image reading portion, which is in a state of being stopped at a predetermined position.

* * * * *